United States Patent
Yang

(10) Patent No.: US 8,982,178 B2
(45) Date of Patent: Mar. 17, 2015

(54) METHOD AND DEVICE FOR ACQUIRING REAL-TIME VIDEO IMAGE OF TERMINAL

(75) Inventor: Zhibing Yang, Huizhou (CN)

(73) Assignee: Huizhou TCL Mobile Communication Co., Ltd., Guangdong (CN)

( * ) Notice: Subject to any disclaimer, the term of this patent is extended or adjusted under 35 U.S.C. 154(b) by 143 days.

(21) Appl. No.: 13/805,314

(22) PCT Filed: Oct. 9, 2011

(86) PCT No.: PCT/CN2011/080567
§ 371 (c)(1),
(2), (4) Date: Dec. 18, 2012

(87) PCT Pub. No.: WO2012/079410
PCT Pub. Date: Jun. 21, 2012

(65) Prior Publication Data
US 2013/0088566 A1  Apr. 11, 2013

(30) Foreign Application Priority Data
Dec. 17, 2010 (CN) .......................... 2010 1 0594352

(51) Int. Cl.
H04N 7/14  (2006.01)
H04W 52/02  (2009.01)

(52) U.S. Cl.
CPC ........... *H04N 7/147* (2013.01); *H04M 2250/12* (2013.01); *H04W 52/0251* (2013.01)
USPC ..................... 348/14.12; 235/375; 250/208.1; 250/458.1; 250/556; 345/102; 345/207; 347/236; 348/14.08; 348/72; 348/130; 348/143; 348/722; 356/400; 369/53.15; 378/98.3; 382/103; 382/240; 382/281; 386/210; 455/457; 715/758

(58) Field of Classification Search
CPC ............. H04N 7/147; H04W 52/0251; H04M 2250/12
USPC ............ 250/458.1, 208.1, 556; 345/207, 102; 348/14.12, 72, 22.1, 722, 222.1, 130, 348/236, 14.08; 356/400; 369/53.15; 382/281, 240, 103; 235/375; 347/236; 378/98.3; 386/210; 455/457; 715/758
See application file for complete search history.

(56) References Cited

U.S. PATENT DOCUMENTS 3,987,244 A * 10/1976 Messman ....................... 348/130
4,473,843 A * 9/1984 Bishop et al. ................ 378/98.3
(Continued)

FOREIGN PATENT DOCUMENTS

| CN | 101262563 | 9/2008 |
|---|---|---|
| CN | 201167378 | 12/2008 |

(Continued)

*Primary Examiner* — Gerald Gauthier
(74) *Attorney, Agent, or Firm* — Kirton McConkie; Evan R. Witt

(57) ABSTRACT

The present invention provides a method and device for acquiring real-time video images of a terminal, sad method comprising: acquiring light intensity of an existing environment when the terminal acquires the real-time video images; comparing the light intensity of the existing environment with a light intensity threshold value set by the terminal system; acquiring images preset by the terminal and sending the preset images to an existing receiver which is communicating with the terminal if the light intensity of the existing environment is lower than the light intensity threshold value set by the terminal system. The present invention can ensure the quality of video conversation when the light intensity is weak, save power energy, improve the user experience, and is beneficial to promote the video communication terminal.

18 Claims, 2 Drawing Sheets

(56) References Cited

U.S. PATENT DOCUMENTS

| | | | |
|---|---|---|---|
| 5,475,420 A * | 12/1995 | Buchin | 348/72 |
| 5,623,479 A * | 4/1997 | Takahashi | 369/53.15 |
| 5,757,506 A * | 5/1998 | Tabatabaei | 356/400 |
| 6,084,641 A * | 7/2000 | Wu | 348/722 |
| 6,794,658 B2 * | 9/2004 | MacAulay et al. | 250/458.1 |
| 7,403,669 B2 * | 7/2008 | Aoyama | 382/281 |
| 7,763,837 B2 * | 7/2010 | Johnson | 250/208.1 |
| 7,801,328 B2 * | 9/2010 | Au et al. | 382/103 |
| 7,804,513 B2 * | 9/2010 | Masuda | 347/236 |
| 8,301,174 B2 * | 10/2012 | An | 455/457 |
| 8,313,018 B2 * | 11/2012 | Wang et al. | 235/375 |
| 8,416,278 B2 * | 4/2013 | Kim et al. | 348/14.08 |
| 8,416,314 B2 * | 4/2013 | Li et al. | 348/222.1 |
| 8,515,195 B2 * | 8/2013 | Mishima et al. | 382/240 |
| 8,532,336 B2 * | 9/2013 | Bobbitt et al. | 382/103 |
| 8,555,179 B2 * | 10/2013 | Lee et al. | 715/758 |
| 8,581,826 B2 * | 11/2013 | Barnhoefer et al. | 345/102 |
| 8,629,830 B2 * | 1/2014 | Barnhoefer et al. | 345/102 |
| 8,693,840 B2 * | 4/2014 | Jia | 386/210 |
| 8,760,511 B2 * | 6/2014 | Lee | 348/143 |
| 8,766,222 B2 * | 7/2014 | Wunderer et al. | 250/556 |
| 2005/0134706 A1 * | 6/2005 | Moon et al. | 348/236 |
| 2006/0023076 A1 | 2/2006 | Jeoung | |
| 2011/0285682 A1 * | 11/2011 | Kwan et al. | 345/207 |
| 2012/0104084 A1 * | 5/2012 | Wang et al. | 235/375 |
| 2013/0088566 A1 * | 4/2013 | Yang | 348/14.12 |

FOREIGN PATENT DOCUMENTS

| | | |
|---|---|---|
| CN | 101345962 | 1/2009 |
| CN | 102098379 | 6/2011 |
| EP | 1622356 | 2/2006 |
| JP | 2000078545 | 3/2000 |
| JP | 2010109758 | 5/2010 |

* cited by examiner

METHOD AND DEVICE FOR ACQUIRING REAL-TIME VIDEO IMAGE OF TERMINAL

TECHNICAL FIELD OF THE INVENTION

The present invention relates to a video communication technology, and more particularly, to a method and device for acquiring a real-time video image of a terminal.

BACKGROUND OF THE INVENTION

As a video communication technology is widely used, the quality requirements of communication processes of a video conversation are higher and higher.

In a $3^{rd}$ Generation (3G), a function of video communication in a cell phone can be further promoted. People can talk "face to face" with their far-away relatives and friends in real time by connecting a video call function in QQ, MSN, or Skype to the cell phone. When dialing a video call by using a 3G cell phone, it does not have to put the cell phone near the ear. Instead, a user is facing the cell phone and putting on a wired microphone or a bluetooth microphone. Then, the user can see images of a party on the other side on a screen of the cell phone. The user's images also can be recorded and be sent to the party on the other side. The video communication is used by more and more customers. Currently, the user can send dynamic video messages and audio messages to another one via the video call, and this achieves a better communication effect.

However, in some circumstances, because the light is too dim, the images from the video call are not good or cannot be seen when using the cell phone such that this not only affects the quality of video communication, but also greatly wastes energy since the cell phone still acquires the real-time video image even when the image is not clear.

How to ensure the quality of video communication when the light intensity is weak, save the energy, and improve the user experience are important issues in this field.

SUMMARY OF THE INVENTION

The technical problem to be solved in the present invention is to provide a method and device for acquiring a real-time video image of a terminal, for ensuring the quality of video conversation when light intensity is weak, saving power energy, and improving the user experience.

The technical scheme adopted in the present invention for solving the technical problem is to provide a method for acquiring real-time video image of a terminal, said method comprising steps of: capturing light rays of an existing environment, transforming the light rays into corresponding intensity level signals, and obtaining a matching light intensity of the existing environment according to a correspondence between the intensity level signals and the light intensity; comparing the light intensity of the existing environment with a light intensity threshold value set in the terminal system; acquiring a preset image of the terminal and sending the preset image to a receiving party which is currently communicating with the terminal if the light intensity of the existing environment is lower than the light intensity threshold value set in the terminal system, controlling an image capturing device of the terminal to acquire a real-time video image if the light intensity of the existing environment is greater than or equal to the light intensity threshold value set in the terminal system.

In which, the preset image of the terminal comprises a video stream captured by the terminal during a video call or a picture stored in the terminal.

In which, the light intensity of the existing environment is periodically captured according to a time value set in the terminal system when capturing the light intensity of the existing environment.

The technical scheme adopted in the present invention for solving the technical problems is to provide a method for acquiring a real-time video image of a terminal, said method comprising steps of: obtaining a light intensity of an existing environment when the terminal is to acquire a real-time video image; comparing the light intensity of the existing environment with a light intensity threshold value set in the terminal system; acquiring a preset image of the terminal and sending the same to a receiving party which is currently communicating with the terminal if the light intensity of the existing environment is lower than the light intensity threshold value set in the terminal system.

In which, the preset image of the terminal comprises a video stream captured by the terminal during a video call or a picture stored in the terminal.

In which, the step of obtaining the light intensity of the existing environment when the terminal is to acquire the real-time video image comprises: capturing light rays of the existing environment; transforming the light rays of the existing environment into corresponding intensity level signals; obtaining a matching light intensity of the existing environment according to a correspondence between the intensity level signals and the light intensity.

In which, after comparing the light intensity of the existing environment with the light intensity threshold value set in the terminal system, said method further comprises: controlling an image capturing device of the terminal to acquire the real-time video image if the light intensity of the existing environment is greater than or equal to the light intensity threshold value set in the terminal system.

In which, the light intensity of the existing environment is periodically captured according to a time value set in the terminal system when capturing the light intensity of the existing environment.

The technical scheme adopted in the present invention for solving the technical problems is to provide a device for acquiring a real-time video image of a terminal, said device comprising: a light intensity obtaining module, for obtaining a light intensity of an existing environment when the terminal is to acquire a real-time video image; a light intensity judging module, for comparing the light intensity of the existing environment with a light intensity threshold value set in the terminal system; an image acquiring switch module, for acquiring a preset image of the terminal when the light intensity of the existing environment is lower than the light intensity threshold value set in the terminal system; a video communication module, for sending the preset image to a receiving party which is currently communicating with the terminal.

In which, the preset image of the terminal comprises a video stream captured by the terminal during a video call or a picture stored in the terminal.

In which, the light intensity obtaining module comprises: a light ray capturing module, for capturing light rays of the existing environment; a light ray transforming module, for transforming the light rays of the existing environment into corresponding intensity level signals; a light intensity matching module, for obtaining a matching light intensity of the existing environment according to a correspondence between the intensity level signals and the light intensity.

In which, the light intensity obtaining module periodically captures the light intensity of the existing environment according to a time value set in the terminal system.

The technical scheme adopted in the present invention for solving the technical problems is to provide a terminal, which comprises: a light sensor, for detecting light rays of an existing environment; a light intensity obtaining module, for obtaining a light intensity of the existing environment when the terminal is to acquire a real-time video image; a light intensity judging module, for comparing the light intensity of the existing environment with a light intensity threshold value set in the terminal system; an image acquiring switch module, for acquiring a preset image of the terminal when the light intensity of the existing environment is lower than the light intensity threshold value set in the terminal system; a video communication module, for sending the preset image to a receiving party which is currently communicating with the terminal; a real-time video image acquiring terminal device, for obtaining the light intensity of the existing environment detected by the light sensor, comparing the light intensity of the existing environment with the light intensity threshold value set in the terminal system, and acquiring the preset image of the terminal and sending the same to the receiving party which is currently communicating with the terminal when the light intensity of the existing environment is lower than the light intensity threshold value set in the terminal system.

In which, the preset image of the terminal comprises a video stream captured by the terminal during a video call or a picture stored in the terminal.

In which, the light intensity obtaining module comprises: a light ray capturing module, for capturing light rays of the existing environment; a light ray transforming module, for transforming the light rays of the existing environment into corresponding intensity level signals; a light intensity matching module, for obtaining a matching light intensity of the existing environment according to a correspondence between the intensity level signals and the light intensity.

In which, the light intensity obtaining module periodically captures the light intensity of the existing environment according to a time value set in the terminal system.

By way of the above embodiments, the present invention can ensure the quality of the video conversation in a situation that the light intensity is weak. The present invention also saves power energy, improves the user experience, and is beneficial to promote the video communication terminal.

DETAILED DESCRIPTION OF THE INVENTION

The present invention will be described in detail as follows in conjunction with drawings and embodiments.

Figure 1:
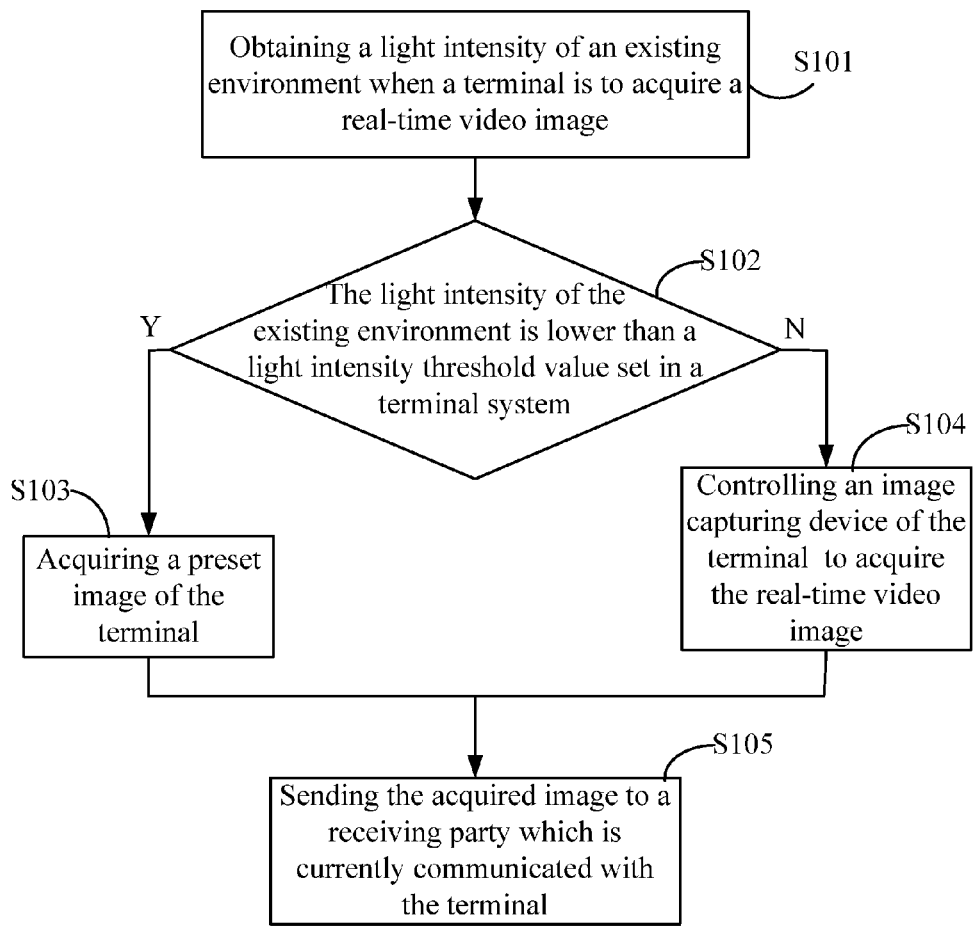
FIG. 1 is a flow chart of a method for acquiring a real-time video image of a terminal provided in an embodiment of the present invention.

FIG. 1 is a flow chart of a method for acquiring a real-time video image of a terminal provided in an embodiment of the present invention.

In Step S101, a light intensity of an existing environment is obtained when the terminal is to acquire a real-time video image.

In concrete implementation, the terminal captures light rays of the existing environment by an inner light sensor and transforms the light rays of the existing environment into corresponding intensity level signals. Generally, the unit is converted into an international unit of luminous intensity, lux, i.e., luminous flux per unit area. Also, the intensity of the light rays is analyzed by using floating point data (e.g., 320.5f). The intensity level signals can be mapped to the light intensity of the existing environment according to a correspondence between the intensity level signals and the light intensity since distinct intensity level signals correspond to distinguishable light intensity.

In Step S102, the light intensity of the existing environment is compared with a light intensity threshold value set in the terminal system for determining whether the light intensity of the existing environment is lower than the light intensity threshold value set in the terminal system.

If the light intensity of the existing environment is lower than the light intensity threshold value set in the terminal system, go to Step S103.

If the light intensity of the existing environment is greater than or equal to the light intensity threshold value set in the terminal system, go to Step S104.

The light intensity threshold value also can be a value (e.g., 50 lux) of macro definition used in a code except that the light intensity threshold value is set in the terminal system. If the terminal system sets the light intensity threshold value, the light intensity threshold value is read out from a corresponding file according to a corresponding position ID of the light intensity threshold value in the file, and the light intensity of the existing environment from the light sensor is compared with the light intensity threshold value.

The light ray corresponding to the light intensity threshold value is a reference light ray for assuring basic image clarity during a video conversation. Once the light ray intensity of the existing environment is lower than that of the reference light ray, this will make the video image unclear and affect the quality of video communication.

In Step S103, a preset image of the terminal is acquired.

Preferably, the preset image of the terminal comprises a second video stream captured by the terminal during a video call, or a picture stored in the terminal. Of course, it also can be other types of images but it is not going to elaborate on them here.

The preset image is preserved at a fixed location in the terminal. When a user presets an image via the terminal, the terminal system will save location information of the second video stream or the picture in the settings after selecting the picture or the second video stream captured during a video call. When the preset second video stream or picture is to be acquired, the location information of the second video stream or the picture is read out from the settings and then the dada at the fixed location are read out. The corresponding second video stream or picture is acquired accordingly.

In Step S104, an image capturing device of the terminal is controlled to acquire a real-time video image.

In Step S105, the acquired image is sent to a receiving party which is currently communicating with the terminal.

When the light rays meet the requirement of video communication, i.e., the light intensity is greater than or equal to the light intensity threshold value, the terminal controls the image capturing device (e.g., a camera) to proceed a capture of the real-time video image. The terminal launches a camera interface by a software program and turns on the camera. The camera starts recording and then captures a first video stream of the real-time video image. The captured first video stream is placed in a storage space of a memory. The first video stream in the storage space is refreshed in real time according to the real-time video image captured by the camera. The terminal sends the first video stream captured by the camera to the receiving party which is currently communicating with the terminal.

When the light rays do not meet the requirement of video communication, i.e., the light intensity is lower than the light intensity threshold value, the terminal turns off the image capturing device and stops proceeding the capture of video images. Also, the terminal stops reading the first video stream captured by the image capturing device from the storage space. Meanwhile, the terminal fetches the preset second video stream or picture from a file system according to the location information of the preset image and sends the acquired second video stream or picture to the receiving party which is currently communicating with the terminal.

In the embodiment of the present invention, the terminal will switch to the real-time video image or the preset image according to the light intensity of the existing environment. The terminal has flexibility to switch to the real-time video image or the preset image to display on a screen when the light state of the existing environment changes, assuring that the receiving party always can see clear images during the video communication.

In the concrete implementation, no matter whether the current light intensity is changed from satisfying the requirement of video communication to not satisfying the requirement of video communication or the current light intensity is changed from not satisfying the requirement of video communication to satisfying the requirement of video communication, the software in the terminal has an overall variable indicating that a type of an image to be sent is the real-time video image or the preset image. The overall variable is set to a corresponding value once the image type to be sent is changed.

The terminal periodically captures the light intensity of the existing environment according to a time value set in the system. For example, the current light intensity is monitored every one second. When it founds that the current light intensity is insufficient but the overall variable indicates that the image type is "the real-time video image", or it founds that the current light intensity is sufficient but the overall variable indicates that the image type is "the preset image", this means that the light state changes. At this time, the terminal will correspondingly alter the way to acquire images.

Obviously, the embodiment of the present invention can ensure the quality of the video conversation in a situation that the light intensity is weak. Moreover, when the light intensity of the existing environment is weak, the terminal no longer acquires the real-time video image via the image capturing device. Instead, the terminal sends out the preset image for serving as the real-time video image. Therefore, power energy is saved greatly.

Figure 2:
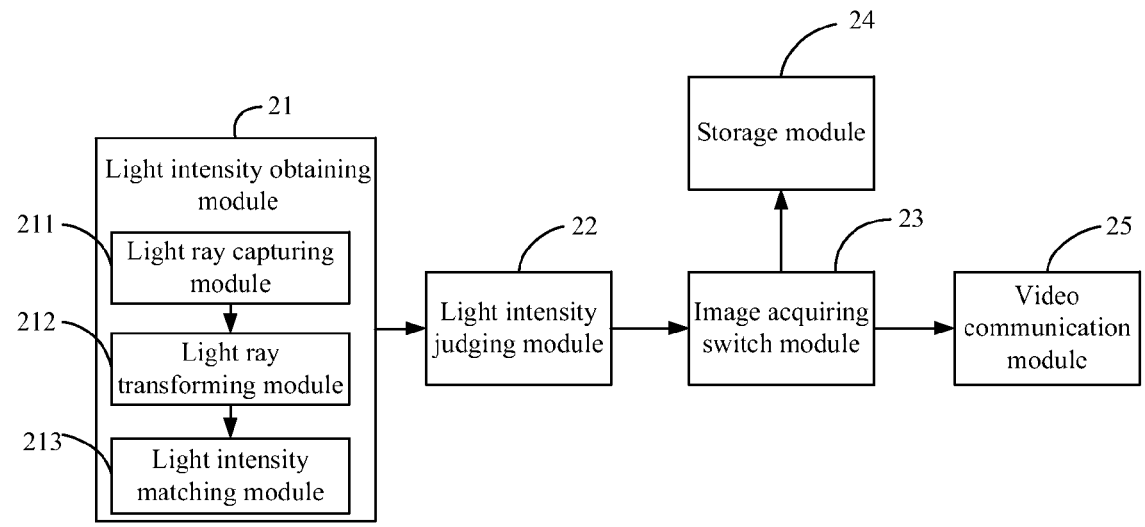
FIG. 2 is a diagram showing a device for acquiring a real-time video image of a terminal provided in an embodiment of the present invention.

FIG. 2 is a diagram showing a device for acquiring a real-time video image of a terminal provided in an embodiment of the present invention.

When the terminal is to acquire a real-time video image, a light intensity obtaining module 21 obtaining a light intensity of an existing environment. Specifically, the light intensity obtaining module 21 comprises:

a light ray capturing module 211 for capturing light rays of the existing environment;

a light ray transforming module 212 for transforming the light rays of the existing environment into corresponding intensity level signals;

a light intensity matching module 213 for obtaining a matching light intensity of the existing environment according to a correspondence between the intensity level signals and the light intensity.

A light intensity judging module 22 compares the light intensity of the existing environment with a light intensity threshold value set in the terminal system.

When the light intensity of the existing environment is lower than the light intensity threshold value set in the terminal system, an image acquiring switch module 23 acquires a preset image of the terminal from a storage module 24. A video communication module 25 sends the preset image acquired by the image acquiring switch module 23 to a receiving party which is currently communicating with the terminal. The storage module 24 stores the preset image of the terminal system.

When the light intensity of the existing environment is greater than or equal to the light intensity threshold value set in the terminal system, the image acquiring switch module 23 controls an image capturing device of the terminal to acquire the real-time video image. The video communication module 25 sends the real-time video image acquired by the image capturing device to the receiving party which is currently communicating with the terminal.

Preferably, the preset image of the terminal comprises a second video stream captured by the terminal during a video call, or a picture stored in the terminal. Of course, it also can be other types of images but it is not going to elaborate on them here.

The principle of the device for acquiring the real-time video image of the terminal provided in the embodiment of the present invention is referred to the processes of the method for acquiring the real-time video image of the terminal as described above, and this is omitted herein.

Figure 3:
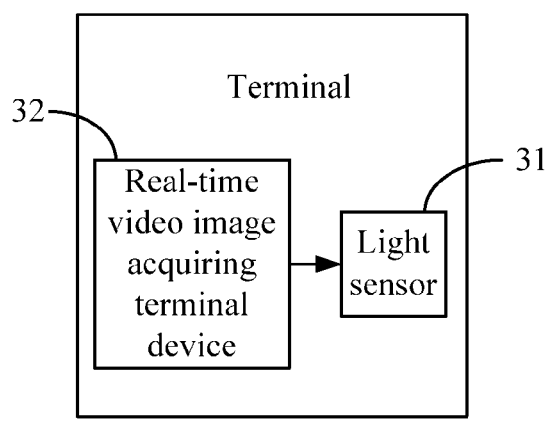
FIG. 3 is a diagram showing a terminal provided in an embodiment of the present invention.

FIG. 3 is a diagram showing a terminal provided in an embodiment of the present invention, which includes a light sensor 31, and further includes a real-time video image acquiring terminal device 32 provided in the embodiment of the present invention.

The light sensor 31 detects the light intensity of the existing environment.

The real-time video image acquiring terminal device 32 obtains the light intensity of the existing environment detected by the light sensor 31 and compares the light intensity of the existing environment with the light intensity threshold value set in the terminal system. If the light intensity of the existing environment is lower than the light intensity threshold value set in the terminal system, the real-time video image acquiring terminal device 32 acquires the preset image of the terminal and sends the same to the receiving party which is currently communicating with the terminal.

The concrete working principle of the real-time video image acquiring terminal device 32 is referred to the descriptions above, and this is omitted herein.

The embodiment of the present invention can ensure the quality of the video conversation in a situation that the light intensity is weak. The embodiment of the present invention also saves power energy, improves the user experience, and is beneficial to promote the video communication terminal.

The above embodiments are merely used to illustrate the present invention. However, after referring to the subject patent application, a person skilled in the art can make all kinds of modifications which maintain the spirit and realm of the present invention.

What is claimed is:

1. A method for acquiring a real-time video image of a terminal, characterized in that said method comprises steps of:
   obtaining a light intensity of an existing environment when the terminal is to acquire a real-time video image;
   comparing the light intensity of the existing environment with a light intensity threshold value set in the terminal;
   providing an overall variable indicating that a type of an image to be sent is the real-time video image or a preset image;
   setting the overall variable to indicate that the type of the image to be sent is the preset image if the light intensity of the existing environment is lower than the light intensity threshold value set in the terminal; and
   acquiring a preset image stored in the terminal and sending the same to a receiving party which is currently communicating with the terminal when the overall variable is set to indicate that the type of the image to be sent is the preset image.

2. The method according to claim 1, wherein the preset image of the terminal comprises a video stream captured by the terminal during a video call or a picture stored in the terminal.

3. The method according to claim 1, wherein the step of obtaining the light intensity of the existing environment when the terminal is to acquire the real-time video image comprises:
   capturing light rays of the existing environment;
   transforming the light rays of the existing environment into corresponding intensity level signals;
   obtaining a matching light intensity of the existing environment according to a correspondence between the intensity level signals and the light intensity.

4. The method according to claim 1, wherein after comparing the light intensity of the existing environment with the light intensity threshold value set in the terminal, said method further comprises:
   controlling an image capturing device of the terminal to acquire the real-time video image if the light intensity of the existing environment is greater than or equal to the light intensity threshold value set in the terminal.

5. The method according to claim 1, wherein the light intensity of the existing environment is periodically captured according to a time value set in the terminal when capturing the light intensity of the existing environment.

6. A device for acquiring a real-time video image of a terminal, comprising:
   a light intensity obtaining module, for obtaining a light intensity of an existing environment when the terminal is to acquire a real-time video image;
   a light intensity judging module, for comparing the light intensity of the existing environment with a light intensity threshold value set in the terminal;
   an image acquiring switch module, for providing an overall variable indicating that a type of an image to be sent is the real-time video image or a preset image, setting the overall variable to indicate that the type of image to be sent is the preset image if the light intensity of the existing environment is lower than the light intensity threshold value set in the terminal, and acquiring the preset image stored in the terminal when the overall variable is set to indicate that the type of the image to be sent is the preset image; and
   a video communication module, for sending the preset image to a receiving party which is currently communicating with the terminal.

7. The device according to claim 6, wherein the preset image of the terminal comprises a video stream captured by the terminal during a video call or a picture stored in the terminal.

8. The device according to claim 6, wherein the light intensity obtaining module comprises:
   a light ray capturing module, for capturing light rays of the existing environment;
   a light ray transforming module, for transforming the light rays of the existing environment into corresponding intensity level signals; and
   a light intensity matching module, for obtaining a matching light intensity of the existing environment according to a correspondence between the intensity level signals and the light intensity.

9. The device according to claim 6, wherein the light intensity obtaining module periodically captures the light intensity of the existing environment according to a time value set in the terminal.

10. A method for acquiring a real-time video image of a terminal, comprising steps of:
    capturing light rays of an existing environment, transforming the light rays into corresponding intensity level signals, and obtaining a matching light intensity of the existing environment according to a correspondence between the intensity level signals and the light intensity;
    comparing the light intensity of the existing environment with a light intensity threshold value set in the terminal;
    providing an overall variable indicating that a type of an image to be sent is the real-time video image or a preset image;
    setting the overall variable to indicate that the type of the image to be sent is the real-time video image if the light intensity of the existing environment is greater than or equal to the light intensity threshold value set in the terminal; and
    setting the overall variable to indicate that the type of the image to be sent is the preset image if the light intensity of the existing environment is lower than the light intensity threshold value set in the terminal system.

11. The method according to claim 10, further comprising:
    controlling an image capturing device of the terminal to acquire the real-time video image when the overall variable is set to indicate that the type of the image to be sent is the real-time video image.

12. The method according to claim 10, further comprising:
    acquiring the preset image stored in the terminal and sending the same to a receiving party which is currently communicating with the terminal when the overall variable is set to indicate that the type of the image to be sent is the preset image.

13. The method according to claim 12, wherein acquiring the preset image stored in the terminal comprises:
    reading out location information of the preset image from settings; and
    reading out data of the preset image according to the location information.

14. The method according to claim 10, wherein the preset image of the terminal comprises a video stream captured by the terminal during a video call or a picture stored in the terminal.

15. The method according to claim 10, wherein the light intensity of the existing environment is converted into an international unit of luminous intensity.

16. The method according to claim 10, wherein the light intensity threshold value is a value of macro definition used in a code.

17. The method according to claim 10, wherein the light intensity threshold value is read out from a corresponding position in a file.

18. The method according to claim 10, wherein the light intensity of the existing environment is periodically captured according to a time value set in the terminal when capturing the light intensity of the existing environment.

* * * * *